United States Patent
Hartog

(10) Patent No.: US 7,859,654 B2
(45) Date of Patent: Dec. 28, 2010

(54) FREQUENCY-SCANNED OPTICAL TIME DOMAIN REFLECTOMETRY

(75) Inventor: Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 334 days.

(21) Appl. No.: 12/174,712

(22) Filed: Jul. 17, 2008

(65) Prior Publication Data

US 2010/0014071 A1    Jan. 21, 2010

(51) Int. Cl.
G01N 21/00 (2006.01)

(52) U.S. Cl. .................................. 356/73.1

(58) Field of Classification Search ........... 356/73.1, 356/477, 479, 497; 250/227.11–227.27; 385/12–27, 114–120
See application file for complete search history.

(56) References Cited

U.S. PATENT DOCUMENTS

| | | | |
|---|---|---|---|
| 2,499,001 A | 2/1950 | Green | |
| 4,708,471 A | 11/1987 | Beckmann | |
| 5,194,847 A | 3/1993 | Taylor | |
| 5,686,986 A | 11/1997 | Li et al. | |
| 5,798,521 A | 8/1998 | Froggatt | |
| 5,929,990 A | 7/1999 | Hall | |
| 6,545,760 B1 | 4/2003 | Froggatt | |
| 6,590,647 B2 | 7/2003 | Stephenson | |
| 6,813,403 B2 | 11/2004 | Tennyson | |
| 7,055,604 B2 | 6/2006 | Jee | |
| 7,126,680 B2 | 10/2006 | Yamate | |
| 7,215,416 B2 | 5/2007 | Yamate | |
| 7,240,730 B2 | 7/2007 | Williams | |
| 7,254,289 B2 | 8/2007 | Wait | |
| 7,283,216 B1 * | 10/2007 | Geng et al. | 356/35.5 |
| 7,284,903 B2 | 10/2007 | Hartog | |
| 7,304,725 B2 | 12/2007 | Hartog | |
| 7,306,043 B2 | 12/2007 | Toekje | |
| 7,387,160 B2 | 6/2008 | O'Shaughnessy | |
| 7,567,349 B2 * | 7/2009 | Tearney et al. | 356/479 |
| 2002/0159134 A1 | 10/2002 | Ghera et al. | |
| 2003/0118347 A1 | 6/2003 | Papaparaskeva et al. | |
| 2004/0129418 A1 | 7/2004 | Jee et al. | |
| 2005/0087344 A1 | 4/2005 | Toekje | |
| 2005/0140966 A1 | 6/2005 | Yamate | |

(Continued)

FOREIGN PATENT DOCUMENTS

GB    2440351    1/2008

(Continued)

OTHER PUBLICATIONS

Barnoski, Fiber waveguides: a novel technique for investigating attenuation characteristics, Applied Optics, vol. 15, No. 9, Sep. 1976, pp. 2112-2115.

(Continued)

*Primary Examiner*—Tu T Nguyen

(57) ABSTRACT

A frequency-scanned optical time domain reflectometry technique includes launching a plurality of interrogating pulses into an optical fiber at a plurality of optical carrier frequencies. A Rayleigh backscatter signal is detected for each interrogating pulse as a function of time between the launching of the pulse and the detection of the backscatter signal. The time resolved Rayleigh backscatter signal at each optical frequency may then be examined to determine a distribution of a physical parameter along the length of the optical fiber.

30 Claims, 5 Drawing Sheets

U.S. PATENT DOCUMENTS

| | | |
|---|---|---|
| 2005/0149264 A1 | 7/2005 | Tarvin |
| 2005/0219512 A1 | 10/2005 | Froggatt |
| 2006/0092404 A1 | 5/2006 | Weller |
| 2006/0102347 A1 | 5/2006 | Smith |
| 2006/0115204 A1 | 6/2006 | Marsh |
| 2006/0146337 A1 | 7/2006 | Hartog |
| 2006/0209291 A1 | 9/2006 | Yamate |
| 2006/0225881 A1 | 10/2006 | O'Shaughnessy |
| 2006/0239330 A1 | 10/2006 | Yamate |
| 2007/0199696 A1 | 8/2007 | Walford |
| 2008/0030739 A1 | 2/2008 | Hartog |
| 2008/0145049 A1 | 6/2008 | Koyamada |

FOREIGN PATENT DOCUMENTS

| | | |
|---|---|---|
| GB | 2440352 | 1/2008 |
| GB | 2440952 | 2/2008 |
| GB | 2441154 | 2/2008 |
| GB | 2441552 | 3/2008 |
| GB | 2442486 | 4/2008 |
| GB | 2443661 A | 5/2008 |
| WO | 2004001357 | 12/2003 |
| WO | 2006048647 | 5/2006 |
| WO | 2006097671 | 9/2006 |
| WO | 2006099056 | 9/2006 |
| WO | 2007141464 | 12/2007 |
| WO | 2008012497 | 1/2008 |
| WO | 2008012498 | 1/2008 |
| WO | 2008012500 | 1/2008 |
| WO | 2008023143 | 2/2008 |
| WO | 2008040939 | 4/2008 |
| WO | 2008075238 | 6/2008 |

OTHER PUBLICATIONS

Eriksrud, Application of the backscattering techniques to the determination of parameter fluctuations in multimode optical fibers, IEEE Journal of Quantum Electronics, vol. QE-18, No. 10, Oct. 1982, pp. 1478-1483.

Hartog, A distributed temperature sensor based on liquid-core optical fibers, Journal of Lightwave Technology, vol. LT-1, No. 3, Sep. 1983, pp. 498-509.

Conduit, Spectral- and length-dependent losses in optical fibres investigated by a two-channel backscatter technique, Electronics Letters, Jan. 31, 1980, vol. 16, No. 3, pp. 77-78.

Conduit, High-resolution measurement of diameter variations in optical fibres by the backscatter method, Electronics Letters, Oct. 1, 1981, vol. 17, No. 20, pp. 742-744.

Gold, Determination of structural parameter variations in single-mode optical fibres by time-domain reflectometry, Electronics Letters, Jun. 10, 1982, vol. 18, No. 12, pp. 489-490.

Murdoch, Distributed measurement of the chromatic dispersion of an optical fiber using a wavelength-tunable OTDR, Journal of Lightwave Technology, vol. 24, No. 4, Apr. 2006, pp. 1681-1688.

Posey, Strain sensing based on coherent Rayleigh scattering in a optical fibre, Electronics Letters, Sep. 28, 2000, vol. 36, No. 20, pp. 1688-1689.

Froggatt, High-spatial-resolution distributed strain measurement in optical fiber with Rayleigh scatter, Applied Optics, Apr. 1, 1998, vol. 37, No. 10, pp. 1735-1740.

Froggatt, Optical time-domain reflectometry in optical fiber with reflection delay time matched to the period of the optical frequency modulation, Applied Optics, Apr. 1, 1998, vol. 37, No. 10, pp. 1731-1734.

Xie, Side-hole fiber for fiber-optic pressure sensing, Optics Letters, May 1986, vol. 11, No. 5, pp. 333-335.

Varnham, Polarimetric strain gauges using high birefringence fibre, Electronic Letters, Aug. 18, 1983, vol. 19, No. 17, pp. 699-700.

Varnham, Analytic solution for the birefringence produced by thermal stress in polarization-maintaining optical fibers, Journal of Lightway Technology, vol. LT-1, No. 2, Jun. 1983, pp. 332-339.

Healey, Fading in heterodyn OTDR, Electronics Letters, Jan. 5, 1984, vol. 20, No. 1, pp. 30-32.

* cited by examiner

FIG. 4
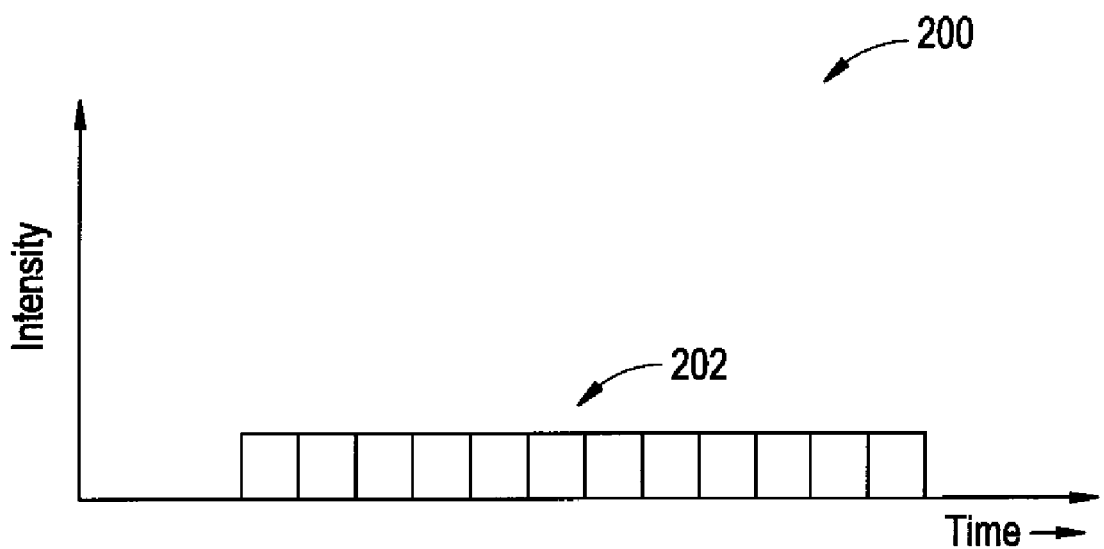
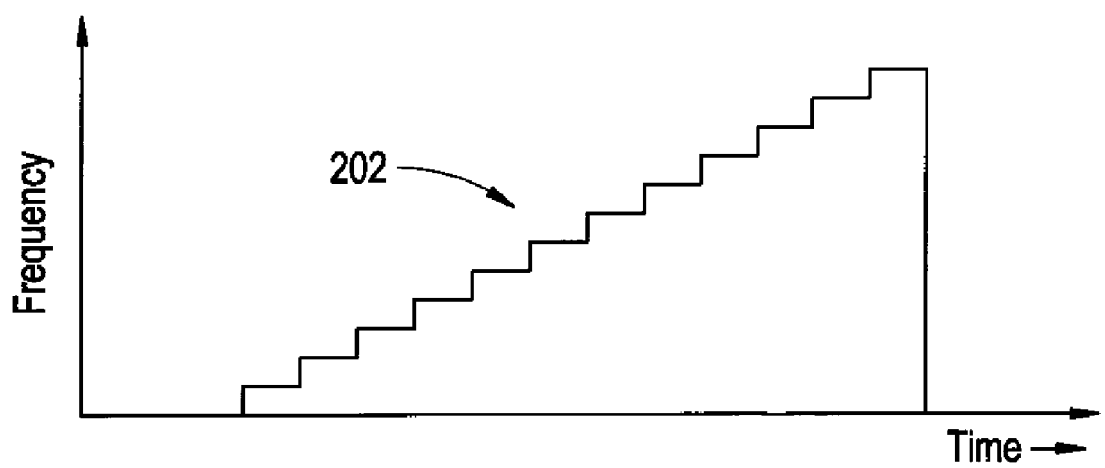

FREQUENCY-SCANNED OPTICAL TIME DOMAIN REFLECTOMETRY

BACKGROUND

Optical time domain reflectometry (OTDR) is a well-known technique for measuring the distribution of a number of parameters of an optical fiber, such as attenuation, core diameter, numerical aperture, and even chromatic dispersion. When a narrow-band source is used in an optical time domain reflectometer to interrogate an optical fiber, Rayleigh backscattered light is produced in response to an interrogating pulse launched into the fiber. In essence, the interrogating pulse can be thought of occupying a certain length of the fiber and, assuming that the pulse is coherent, all the electric dipoles arising from the non-homogeneity of the glass have a fixed (though random) phase relationship to one another. The resulting backscatter signal for a particular section of the fiber is then treated as the coherent sum of all the electric fields of these dipoles. This sum is, of course, dependent on the phase as well as the amplitudes of each dipole. For a fixed optical source frequency and a fixed state of the fiber (i.e., a fixed temperature, strain, etc.), the backscatter return (relative to the pulse energy) from a particular location is fixed, but randomly related to the backscatter return from any other section of fiber. As used herein, the backscatter return is the optical power (or intensity) as detected, for example, by a photodiode generally located at the launching end of the fiber. The detected backscatter signature for a given state of the fiber takes the form of a spiky waveform, with excursions about a mean value of at least a factor of ten. When the state of the fiber is varied, the vector summation changes and the backscatter return thus changes. These changes in the detected backscatter signal may be exploited for detecting disturbances, such as intruders into a perimeter monitored by the fiber, or even for measuring dynamic strain (i.e., changes in a strain level without particular interest in the absolute strain value). While, conceptually, these effects are easiest thought of in single-mode fibers, the following description is not restricted to single-mode fibers and indeed similar effects have been observed in multimode fibers.

In some applications, tunable optical sources have been used to scan the optical carrier frequency while performing reflectometric measurements in optical fibers. However, while such applications typically provide high resolution in the measurement of a parameter of interest, there is generally either no position resolution (i.e., the measurement is a pure optical frequency domain reflectometry (OFDR) measurement), or the technique has been used to measure discrete reflectors, such as fiber Bragg gratings, as opposed to a distributed measurement. Moreover, such applications typically compare a signal from a reference fiber to a signal from the fiber of interest. The use of a reference fiber and the comparison involved in such applications adds an unnecessary level of complexity that detracts from the measurement of absolute values of the distribution of the parameter of interest.

SUMMARY

In accordance with one embodiment of the invention, a method of determining a physical parameter associated with an optical fiber comprises launching a plurality of interrogating pulses into the optical fiber, wherein at least a first interrogating pulse has a first optical carrier frequency and a second interrogating pulse has a second optical carrier frequency different than the first optical carrier frequency. The method further comprises acquiring, for each of the plurality of interrogating pulses, a Rayleigh backscatter signal as a function of time, and, based on the detecting, determining a distribution of a first physical parameter along a length of the optical fiber.

In accordance with an embodiment of the invention, a system for determining the distribution of a physical parameter along an optical fiber comprises an optical fiber, an optical source to output a plurality of optical pulses at a plurality of optical frequencies for launching into the optical fiber, and a detection and acquisition system coupled to the optical fiber. The detection and acquisition system is configured to detect Rayleigh backscatter corresponding to each launched pulse as a function of time, acquire a time resolved coherent Rayleigh spectra (TRCRS) measurement corresponding to each of the optical frequencies, and determine a distribution of a physical parameter along the length of the fiber based on the TRCRS measurements.

Other or alternative features will become apparent from the following description, from the drawings, and from the claims.

BRIEF DESCRIPTION OF THE DRAWINGS

FIG. 4 is a representation of a frequency plan for a plurality of interrogating pulses to be launched into the fiber of interest of the system of FIG. 3.

DETAILED DESCRIPTION

Figure 1:
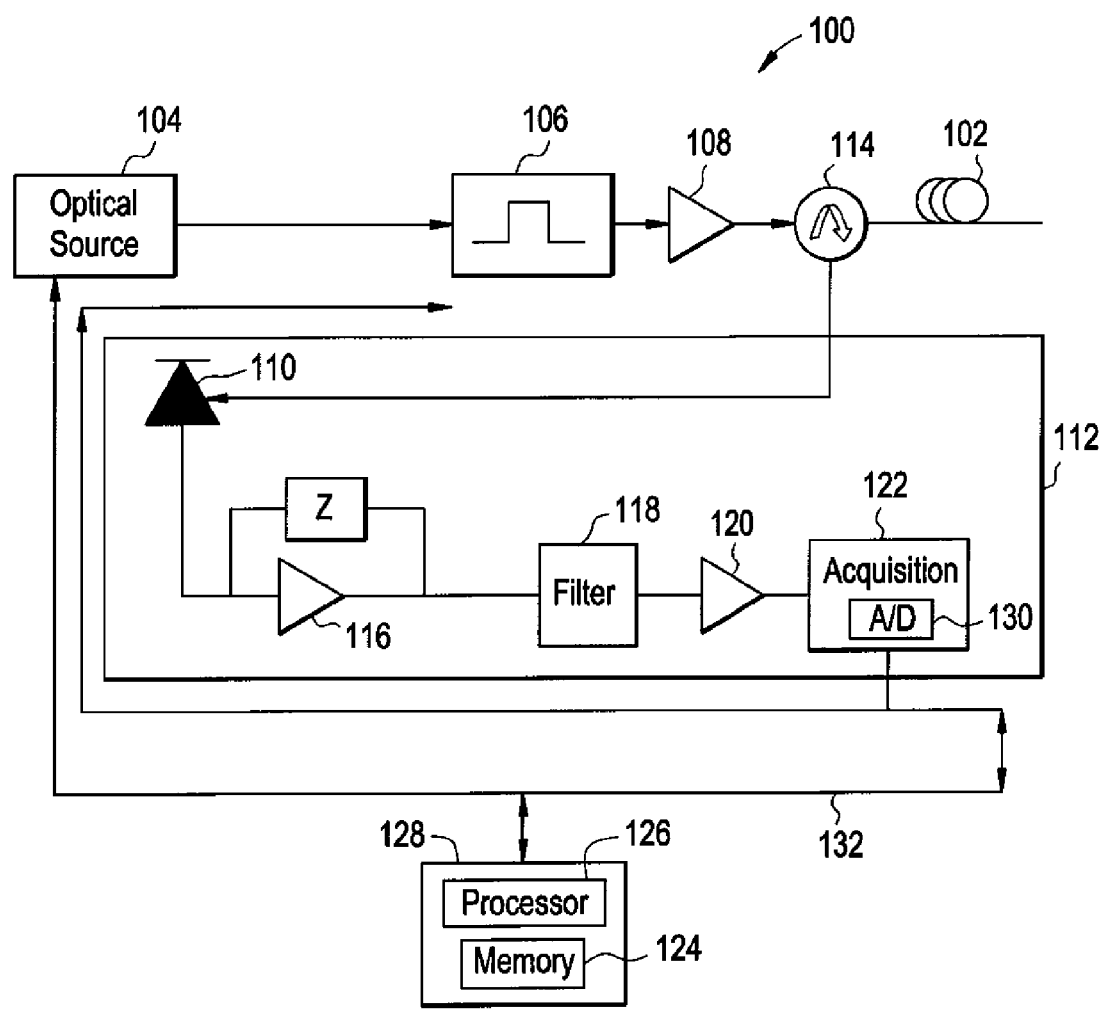
FIG. 1 is a diagram of a distributed sensor system in accordance with an embodiment of the invention.

In the following description, numerous details are set forth to provide an understanding of the present invention. However, it will be understood by those skilled in the art that the present invention may be practiced without these details and that numerous variations or modifications from the described embodiments are possible.

In accordance with an embodiment of the invention, OTDR techniques may be combined with OFDR techniques to provide position resolution of data similar to the resolution that may be obtained with OFDR for any individual section of fiber. OTDR data is collected separately by taking a large number of measurements of the Rayleigh backscatter signal in the time domain. Acquiring the data from the signal as a function of time since the launching of an interrogation pulse provides position information along the fiber. A time domain data set is collected separately for each optical carrier frequency of the interrogating pulse by varying the optical carrier frequency of an optical source (e.g., a tunable narrowband laser) in a known manner between pulses or sets of pulses.

Thus, in accordance with this technique, a time resolved coherent backscatter signal measurement may be obtained for each optical carrier frequency of interest. After a set of such measurements has been acquired for each of a plurality of optical frequencies, the measurement set corresponding to each optical frequency may be processed by treating each spatial resolution cell along the length of the fiber as a separate piece of fiber for which OFDR data is available.

As mentioned previously, the phase and the amplitude of the backscatter signals are random. To account for this random nature, a signature or calibration measurement first may be obtained for each spatial resolution cell along the length of the fiber. The signature for each section of fiber is unique in the sense that the signature is characteristic of that piece of fiber in the same way that an individual's DNA or fingerprint is unique to that individual. The unique quality of the signature arises from the specific arrangement of the scattering centers that were created from thermodynamically-driven inhomogeneities in the glass as it cools during the fiber-drawing process. The relative position, and strength, of these scattering centers is thus random and unique. To obtain the signature of the fiber, a series of backscatter traces are acquired as a function of optical carrier frequency with the fiber in a known state. The traces may then be stored in a memory of the acquisition system for later reference. In some embodiments, the known state of the fiber may be a known uniform temperature with a known uniform strain. However, it should be understood that any distribution of strain and temperature may be used for obtaining the signature of the fiber, provided that the conditions are known. Thus, for each spatial resolution cell (i.e., time resolved section) of fiber, a unique signature is obtained, which is expressed as the backscatter return intensity as a function of frequency.

In essence, by acquiring time-domain data for each spatial resolution cell at each optical frequency, a 3-D map having the dimensions of distance along the fiber, optical frequency of the source, and backscatter signal intensity is acquired. In some embodiments, it may be desirable to acquire phase information, as well as the backscatter intensity, for each spatial resolution cell at each optical frequency. A plane within this 3-D map (i.e., backscatter signal intensity (and/or phase) as a function of optical frequency at a particular location along the fiber) is, in effect, an optical frequency-domain reflectometry measurement. However, true OFDR measurements only provide information on the measurand, and do not provide position information along the fiber. Thus, by combining OFDR with the OTDR measurements, position information may be provided by the time-domain information, while the frequency-domain data provides the information on the measurand. As discussed above, this function is characteristic of each piece of fiber and scales along the frequency axis with the measurand.

Because the measurand scales with optical frequency, the signature of the fiber may then be used as a baseline measurement that may later be compared to newly acquired data to determine the value of a physical parameter (e.g., temperature, strain, pressure, etc.) at resolved locations along the fiber. When a section of fiber is stretched or heated, the relative locations of the scattering centers change in a manner that scales directly with optical frequency. Thus, if the state of the fiber changes, and if the change in optical frequency that results in a pattern similar to that of the signature can be determined, then the departure of the state of the fiber from the original state may be determined. More specifically, for each time resolved location along the fiber, the newly acquired backscatter trace for each optical frequency may be compared to the signature backscatter trace at that location and optical frequency. By determining the amount of frequency shift needed to make the newly acquired backscatter trace pattern for each time resolved location overlap the corresponding signature trace, the distribution of the measurand along the length of the fiber may be determined.

In some embodiments, it may be desirable to acquire additional information to independently determine which of several possible physical mechanisms is contributing to a change in state of the fiber. Such information may be obtained from a completely different type of measurement, such as a measurement of Brillouin backscatter (which provides an estimate of a combination of strain and temperature via acquisition of the Brillouin intensity, frequency shift and/or line width) or a measurement of Raman backscatter (which is primarily temperature sensitive). Alternatively, multiple independent measurements of time resolved coherent Rayleigh spectra (TR-CRS) may be obtained that provide the independent information for different measurands. For example, a high birefringence fiber (especially a stress-birefringent type of fiber) exhibits differential temperature and strain responses on each of its principle axes. Measurements of TRCRS on each axis may thus be used to separate the effects of temperature and strain. Similarly, if a pressure-dependent birefringent fiber is used, such as a side-hole fiber or a birefringent photonic crystal fiber, then measurements of TRCRS may be used to determine temperature and pressure profiles simultaneously and independently.

Referring now to FIG. 1, in an embodiment of a system 100 for obtaining TRCRS measurements from an optical fiber of interest 102 at each of a plurality of optical frequencies is illustrated. The system 100 includes a narrowband tunable optical source 104 having an output that is converted to pulses by a modulator 106 prior to being launched into the fiber 102 to be measured. In some embodiments, such as the embodiment illustrated in FIG. 1, the pulse output by the modulator 106 is amplified by an amplifier 108 prior to being launched into the fiber 102. The backscattered light produced by the fiber 102 in response to the light pulse is guided back towards the launching end of the fiber 102 and directed to an optical detector 110, such as a photodiode, in a data detection and acquisition system 112. Forward and backward traveling light in the optical path leading to the fiber 102 are separated by a beam splitter device 114, such as a circulator, a directional coupler, a fast optical switch, etc. The backscattered light guided to the data detection and acquisition system 112 is converted to a photocurrent by the detector 110. The photocurrent may then be amplified in a preamplifier 116, filtered by filter 118 and further amplified by amplifier 120 prior to data being acquired or extracted therefrom by acquisition system 122. The preamplifier 116 may be a transimpedance amplifier circuit, for instance, that provides an output voltage proportional to the photocurrent flowing into its input.

Generally, the acquisition system 122 is configured to convert the signal output by the amplifier 120 into data that is then stored in a memory 124 accessible to a processor 126 in a processing system 128. For instance, as shown in FIG. 1, a high-speed A/D converter 130 may acquire or extract the data from the electrical signal representative of the photocurrent. The A/D converter 130 is configured to sample the electrical signal sufficiently frequently such that a sufficient number of time samples to provide the positional information along the fiber are acquired for each optical pulse launched into the fiber 102. For example, if it is desired to sample at 1 meter intervals along the fiber 102, then an A/D converter 130 having a sampling frequency of at least 100 M samples/second is preferred. In addition, in certain cases, it may be desirable to provide data acquisition electronics that are configured to average (or sum) the samples for a programmable number of launched pulses so as to improve the signal-to-noise ratio of the acquired backscatter signals.

The acquired data then may be stored in the memory 124 of the processing system 128 for access by the processor 126. In various embodiments of the invention, the processing system 128 may be combined with the detection and acquisition system 112 or may be coupled to the acquisition system 112 through a communication link 132, such as a network. Alternatively, the processing system 128 unit may be part of a control center. In one embodiment, in addition to the memory 124 and the processor 126, the processing system 128 may comprise an input device and an output device. The memory 128 may also store algorithms for determining various physical parameters associated with the fiber 102 under test based on the acquired data, as well as algorithms for controlling the optical source 104 and/or the modulator 106 and/or the acquisition system 122. For instance, such algorithms may dictate the number of pulses to launch into the fiber 102 for each optical frequency of interest, the time between launched pulses (i.e., the pulse repetition frequency), the pulse width output by the modulator 106, the procedure for changing the optical frequency of the optical source 104 (e.g., when to adjust the frequency, the magnitude of the frequency step, etc.), the rate at which the acquisition system 122 samples the electrical signal produced by the detector 110, etc. The input device may be a variety of types of devices, such as a keyboard, mouse, a touch screen, etc. The output device may include a visual and/or audio output device, such as a monitor having a graphical user interface.

When one or more TRCRS traces have been acquired at a particular optical frequency (as dictated by the algorithm stored in the processing system 128) and stored, the frequency of the optical source 104 is adjusted and the process of acquiring TRCRS traces is repeated until a desired set of TRCRS waveforms at a plurality of different optical frequencies has been acquired. The set of data may cover a suitable range of optical frequencies and length of fiber and be sampled adequately both in the optical carrier frequency dimension and in the spatial dimension along the fiber to acquire the measurand of interest.

The data set acquired using the technique described above may be of a substantial size. For example, given an optical fiber 102 having a length of 10 kilometers sampled at 1 meter intervals, 10,000 data samples may be acquired. Assuming a spatial resolution of 2 meters, the frequency sampling resolution (i.e., the steps between successive values of the optical carrier frequency emitted by the source 104) should preferably be at least 50 MHz. In some embodiments some degree of oversampling may be desired. For instance, oversampling by a factor of two in the above example results in frequency steps of 25 MHz. Further, to cover a measurand (e.g. strain) range of 0-1%, a frequency range of 2% of nominal frequency may be employed. Thus, for example, for a central frequency of 193.3 THz, a frequency range of 3.8 THz may be covered. The foregoing example (which includes oversampling by a factor of two) results in a data set containing approximately 155,000 frequencies and approximately 1.55 giga-points of data.

In some embodiments, it may be possible to extract the measurand without oversampling in the frequency dimension. Yet further, the frequency sampling process may not be uniform (i.e., more samples may be taken at certain frequency ranges than others) as data extraction schemes for certain types of measurands may tolerate gaps in the frequency sampling. However, in embodiments in which some frequencies are not sampled, the unsampled frequency region generally may be substantially narrower than the frequency regions in which sampling does occur.

In the example above in which the fiber 102 has a length of 10 kilometers, the maximum pulse repetition frequency that may be allowed in order to avoid ambiguity in resolving the location along the fiber associated with the backscatter signal is about 10 kHz. This would result, for the 155,000 samples in the frequency dimension, in a minimum acquisition time of approximately 16 seconds. In this case, the pulse repetition frequency is limited by the desire to ensure that only one pulse is travelling in the fiber at any one time to avoid ambiguity in the backscatter return. Thus, another pulse may not be launched until the previous pulse has reached the far end of the fiber and any resulting backscatter from the most remote point has returned to the launching end of the fiber. In other words, a time interval of at least 10 nanoseconds/meter of fiber may be imposed between pulses.

If such a time delay is not acceptable for the particular application in which the system 100 is employed, then the undersampling techniques described above may be used. As another alternative to shortening the time for acquiring the data, if the value of the measurand is confined (by the nature of the application) to a relatively small range of optical frequencies, it may be possible to restrict the optical frequency range yet further, even if the measurand value varies along the length of the fiber. Here, a wide-range initial measurement may be taken that may allow the value of the measurand to be established over a wide range of possible optical frequencies. Subsequent scans then may be confined to a narrower optical frequency range if the measurand is known locally to vary only over a small frequency range. In the approach just described, the wide-range reference serves, in effect, as a new baseline for the TRCRS along the fiber 102.

In the embodiment illustrated in FIG. 1, the optical source 104 is a narrowband source such that the backscatter interacts essentially coherently with substantially all the scatterers in the sections of the fiber 102 occupied by an optical pulse. The linewidth of an optical pulse is the coherence time of the output signal provided by the optical source 104 prior to the output signal being modulated into pulses. In one embodiment of the invention, the coherence time of the optical signal may be at least as long as, and preferably much longer than, the duration of the pulse output by the modulator 106. Although optical sources 104 with shorter coherence times may be employed, such applications may result in a lesser self interference of the backscattered light, thus reducing the visibility of the resulting interference detected by the detector 110. Thus, for example, in an embodiment in which a 10 meter spatial resolution is desired, the linewidth of the optical source 104 to provide a coherence length equal to the spatial resolution is approximately 10 MHz. In this example, to ensure that the visibility of the resulting interference signal is not reduced, an optical source 104 having a linewidth of 1 MHz may be used.

The optical frequency of the optical source 104 also should be substantially stable in order to acquire meaningful data at each discrete frequency. Thus, for instance, the optical source frequency should have a stability that is within the difference in frequency between each discrete optical frequency at which data is acquired.

Figure 2:
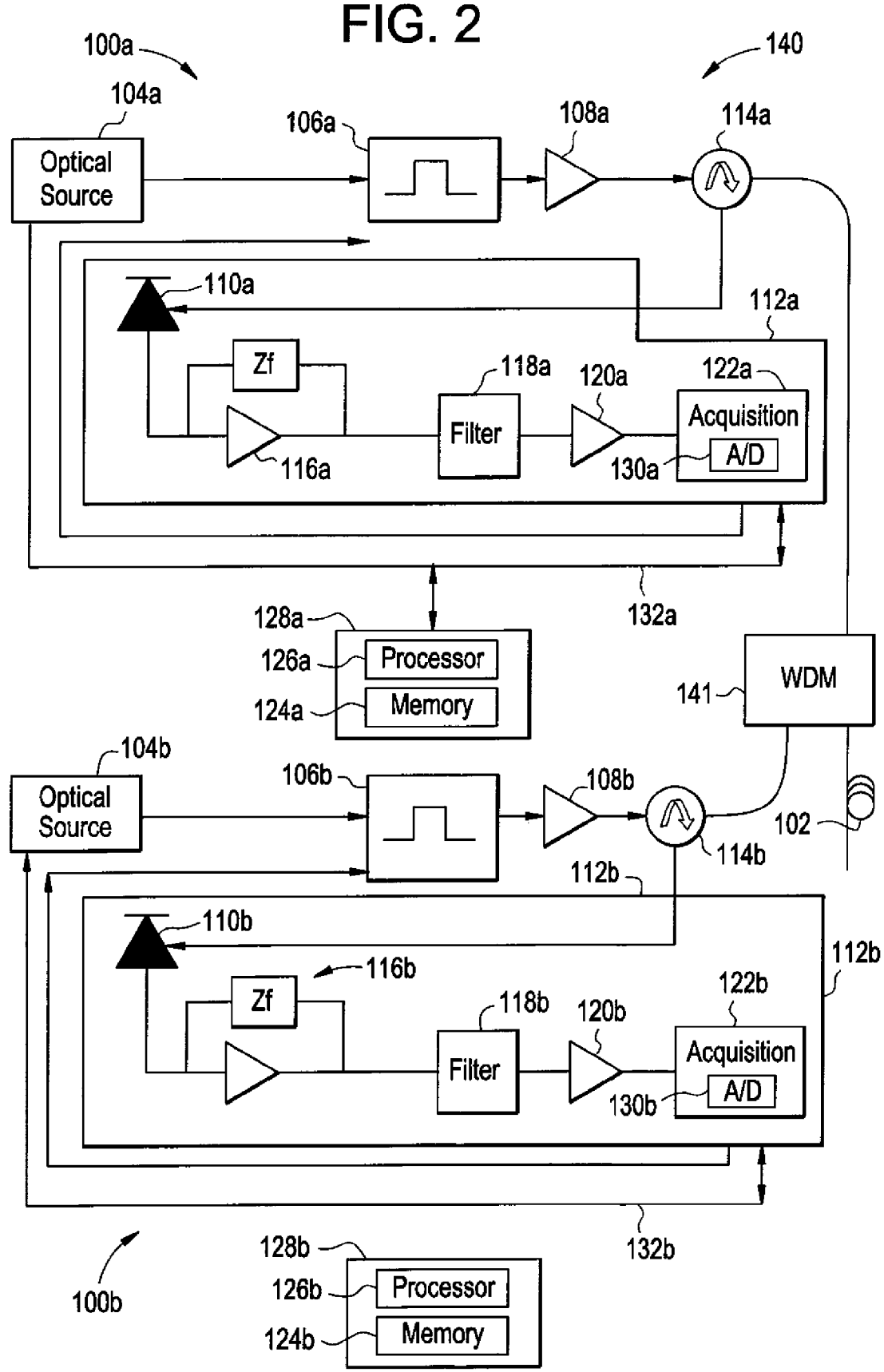
FIG. 2 is a diagram of a distributed sensor system for acquiring data in parallel from the fiber of interest, in accordance with an embodiment of the invention.

In embodiments in which fast measurements of the parameter of interest are of particular concern, several sets of frequency data sets may be acquired in parallel. In such an embodiment, substantially the entire arrangement 100 of FIG. 1 for interrogating and acquiring data from the fiber 102 may be duplicated, and the frequency dimension may be separated using wavelength-division multiplexing techniques. For instance, as shown in FIG. 2, a wavelength division multiplexer 140 may be interposed between the beam splitters 114a,b and the remainder of the optics infrastructure of arrangements 100a,b, including the optical source 104a,b, the modulator 106a,b, and the detection and acquisition system 112a, b (including detector 110a,b, preamplifier 116a,b, filter 118a,b, and data acquisition unit 122a,b, with A/D converter 130a,b) and the processing system 128a,b (including memory 124*a,b* and processor 126*a,b*). In such a system, interrogating pulses at two different optical frequencies may be launched with overlapping pulse transit times in the fiber 102.

Figure 3:
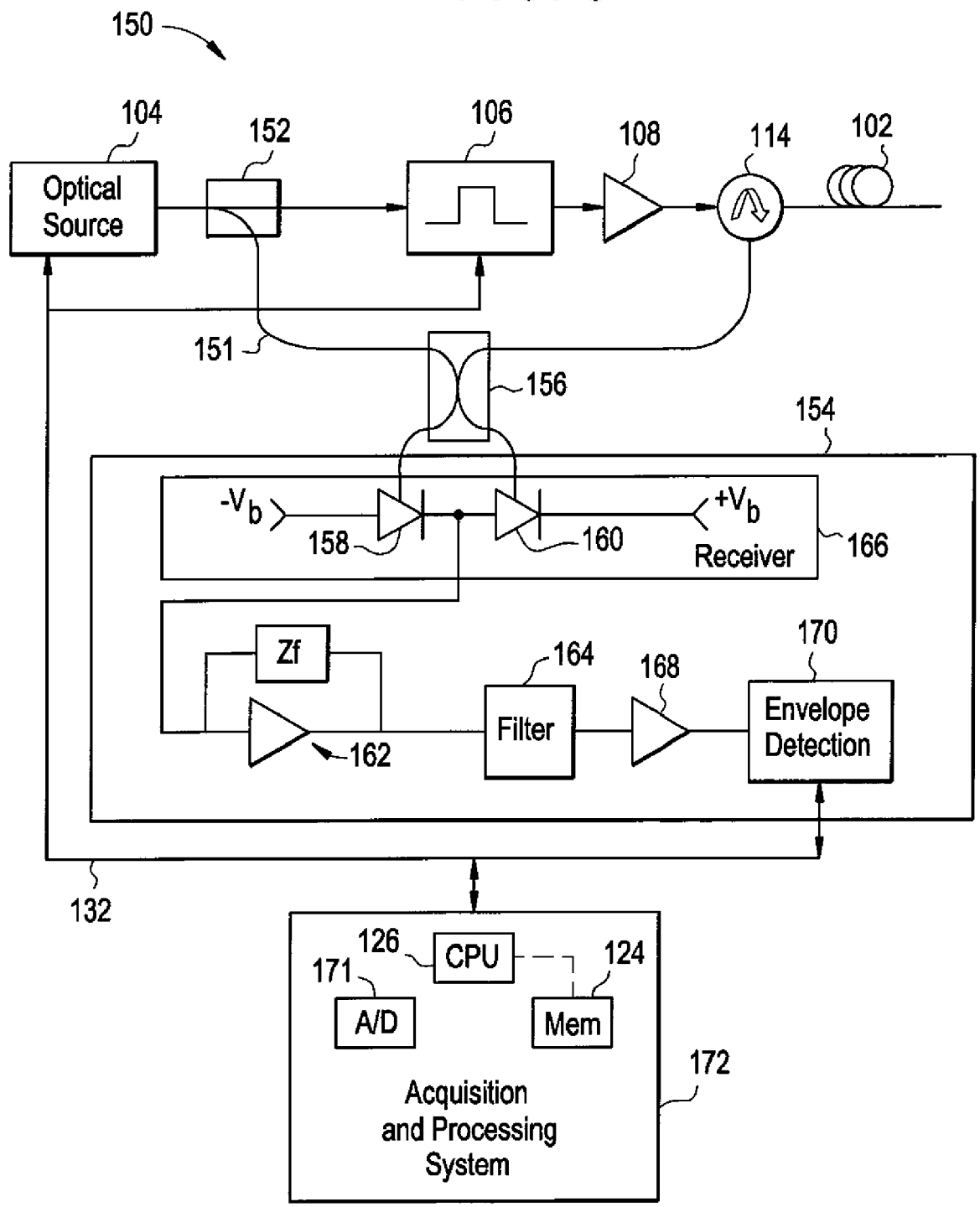
FIG. 3 is a diagram of another embodiment of a distributed sensor system that employs coherent detection techniques, in accordance with an embodiment of the invention.

The arrangements and techniques described above also may be used in conjunction with coherent detection, as illustrated in the system 150 of FIG. 3. A coherent detection scheme involves directing a portion (the local oscillator) of the light emitted by the optical source 104 via an optical path 151 to the detector 110 simultaneously with the backscatter signal to be measured. For instance, as shown in FIG. 3, a beamsplitter 152 directs a first portion of the output signal from source 104 to the modulator 106 and a second portion (i.e., the local oscillator) of the output signal from source 104 to a detection and acquisition system 154. A beam combiner 156 combines the local oscillator portion of the source 104 signal with the Rayleigh backscatter produced by the fiber 102 in response to an interrogating pulse. In the embodiment shown in FIG. 3, the beam combiner 156 has two outputs, which are complementary in that they are naturally out of phase with each other. The two outputs are provided to a balanced receiver arrangement 166, which includes a photodetector 158 coupled to a negative bias voltage supply $-V_b$, and a photodetector 160 coupled to a positive bias voltage supply $+V_b$. In this balanced received arrangement, one of photodetectors 158 and 160 adds to the photocurrent input to the amplifier 162 while the other photodetector 160 or 158 subtracts from the photocurrent. Although in alternative embodiments only one of the outputs of the beam combiner 156 may be used, the use of the balanced receiver 166 (and both outputs of the combiner 156) reduces (and ideally eliminates) the DC signal component of the detected backscatter signal and increases the fraction of the backscattered signal that actually provides a useful electrical signal.

In the embodiment illustrated in FIG. 3, either the signal in the signal path between the source 104 and the sensing fiber 102 or the signal (i.e., the local oscillator) signal path 151 between the source 104 and the combiner 156 may be frequency shifted such that the returned Rayleigh backscatter is at a slightly different frequency than the local oscillator in the path 151. For instance, the modulator 106 may introduce a frequency shift in the interrogating pulse (e.g., an acousto-optic modulator will naturally shift the frequency as a result of the acousto-optic interaction), or the local oscillator signal may be frequency shifted. Such a frequency shifting arrangement (referred to as heterodyne detection) eliminates the DC component of the signal detected by the receiver 166. The resulting electrical signal produced by the receiver 166 then appears at the difference frequency (referred to as the intermediate frequency (IF)) between the interrogating pulse frequency and the local oscillator of the source 104.

Referring still to FIG. 3, the backscattered light returned from the sensing fiber 102 in response to an interrogating pulse is directed by the circulator 114 to a port of the combiner 156 and then to the receiver 166 where it is mixed with the local oscillator. The resulting photocurrent generating by the detectors 158 and 160 of the receiver 166 is provided to the amplifier 162. The amplified signal output from the amplifier 162 may be filtered by the filter 164 such that a frequency band around the IF is selected and then furthered boosted by an amplifier 168. If acquisition of only the intensity of the backscatter signal is desired, then the intensity may be obtained by passing the filtered and boosted IF signal through an envelope detector 170 and then acquiring the data via acquisition and processing system 172 by digitizing the resulting baseband signal using an analog-to-digital (A/D) converter 171. Alternatively, the amplified and boosted IF signal can be digitized directly by the acquisition and processing system 172 and the intensity of the backscatter signal derived from the digitized IF by digital signal processing.

In embodiments in which acquisition of the phase of the backscattered signal also is desired, the phase information may be extracted from the filtered and boosted IF signal in the analog domain, or may be extracted from the digitized signal in the signal processing domain.

The use of the coherent detection in the context of the combined OTDR/OFDR measurements described herein presents a number of advantages, including a reduced dynamic range of the detected signals, an improved signal-to-noise ratio, the ability to measure phase as well as backscatter intensity, and the ability to launch pulses at multiple frequencies simultaneously into the fiber 102. Another advantage of coherent detection is that the electrical signal generated by the receiver 166 and provided to the amplifier 162 is proportional to the geometric mean of the optical power of the backscatter signal and the local oscillator. As a result, the power of the local oscillator of the source 104 may be increased to a point where the electrical signal provided to the amplifier 162 is substantially greater than the noise produced by the amplifier 162. Accordingly, the noise of the amplifier 162 is negligible and the signal-to-noise ratio is limited only by the photon statistics of the backscatter signal.

A still further advantage of the coherent detection scheme illustrated in FIG. 3 is that the filter 164 may be centered on the known intermediate frequency between the Rayleigh backscatter signal and the local oscillator. As a result, the filter 164 may be a fairly narrow band filter such that the noise that reaches the acquisition and processing system 172 is likewise narrowed considerably. More specifically, because the filtering of the signal is performed in the electrical domain, the filter width may be precisely matched to the electrical bandwidth required for a correct rendering of the baseband signal.

Due the narrow band filtering capability of coherent detection, multiple interrogating pulses having different optical frequencies may be launched simultaneously into the sensing fiber 102 since the Rayleigh backscatter associated with each pulse may be separated by filtering. As discussed previously, depending on the particular measurand, it may be desirable to launch optical pulses at a very large number of optical frequencies in order fully to probe the frequency map that the range of the measurand may require. In such embodiments, the multiple interrogating pulses may be launched either simultaneously or consecutively (i.e., without waiting for the backscatter return from a previous pulse). An exemplary scheme 200 for generating multiple pulses from the source 104 is illustrated in FIG. 4, where the top graph illustrates the intensity of a sequence 202 of pulses and the bottom graph illustrates the frequency of the pulse sequence 202. According to pulse scheme 200, a sequence of adjacent pulses 202 having substantially the same intensity are stepped in frequency by a predetermined amount using, for instance, a staircase frequency generator. Other frequency stepping schemes are of course possible. In this embodiment, the multiple backscatter signals returning at the different optical frequencies may be separated by replacing the filter 164 in FIG. 3 with a plurality of electrical filters 164 arranged in a parallel configuration, each of which has a narrow band about the center frequency that corresponds to the IF at which the backscatter signal resulting from each pulse in the sequence 202 appears. In one embodiment, each of the filters 164 may be followed by an analog-to-digital converter 171 in the acquisition and processing system 172 to digitize the baseband signal. Alternatively, the system 172 may include a single, high-speed A/D converter 171 and the digitized signals may be subsequently separately by digital signal processing, for example with a fast Fourier transform algorithm. In addition, in embodiments in which the pulses of different frequencies are launched sequentially (rather than simultaneously), the filtered outputs from the filters 164 are time-shifted after filtering to ensure that each backscatter signal is correctly aligned with respect to the other backscatter signals.

In embodiments in which phase information is acquired as well as backscatter intensity (or amplitude) information, the phase information can be used in isolation from or in conjunction with the intensity information to provide a comparison with the backscatter signature.

The combined OTDR/OFDR technique and detection methods described above may be used for the measurement, on a spatially resolved basis (also referred to as distributed sensing), of a number of fiber measurands or parameters. For instance, any external effect that modifies either the physical length of the fiber 102 (e.g., strain) or its refractive index (e.g., temperature, pressure, strain) is detectable with these methods. Using the OTDR/OFDR technique to obtain such measurements is particularly advantageous because of the extremely high resolutions that may be achieved. For example, in the measurement of temperature, the resolution may be less than 1 milliKelvin in a single launch of an optical pulse per frequency. The technique is also particularly advantageous in that the acquisition of the data may be accomplished in a matter of seconds. The resolution and rapid acquisition of the data is far in excess of that currently achievable with technologies based on inelastic scattering, such as Raman or Brillouin scattering.

As discussed above, each section of the fiber 102 has its own distinct intensity as a function of frequency signature or pattern that scales on the frequency axis with a change in either length or refractive index of the fiber 102. In more precise terms, it should be understood that each orthogonal state of polarization has its own such pattern or signature. Accordingly, in order to avoid confusion from a possible variation of the state of polarization of the light incident on the fiber, it may be desirable in certain applications to use a polarization-preserving fiber that generally conserves the state of polarization of light launched on one or other of the preferred axes (or principal axes) of the fiber 102.

Polarization-preserving fibers, particularly those based on strain-induced birefringence, may also be used to measure temperature and strain distributions simultaneously and independently. In polarization-preserving fibers, the refractive index of each axis changes differently as a function of strain and temperature. Thus, by measuring the TRCRS on each polarization axis separately, the effect of temperature and strain can be determined independently and simultaneously. The birefringence of a polarization-preserving fiber based on thermal-stress-induced birefringence changes with strain and with temperature. More particularly, the birefringence of the fiber decreases with increasing temperature, since the internal stress of the fiber is proportional to the difference between the temperature to which the fiber is currently exposed and the temperature at which the glass set. In contrast, the birefringence change in this type of fiber resulting from strain is caused by the difference in the Poisson's ratios of the two glasses forming the bulk of the fiber and the stress-applying sectors. The TRCRS measurement may provide independent measurements of the optical path length change per unit length on each axis by configuring the launching of the optical pulses into the fiber, the detection and data acquisition electronics, and the processing system appropriately. The response of the signal from each axis is a linear combination of the effects of temperature and strain and can be inverted to provide independent determination of these two measurands.

As to the measurement of pressure distributions, a fiber that has a pressure-dependent birefringence, such as a side-hole fiber, or a birefringent photonic crystal fiber may be used. Again in this case, the TRCRS is measured on each polarization axis and the two results are combined to provide a temperature and pressure measurement at each resolved position. Conventional pressure sensors based on a side-hole fiber are typically polarimetric, i.e., the difference in the photo-elastic effects of pressure for each axis is formed directly in the optical domain. In contrast, the TRCRS measurements described herein provide an independent measurement of the optical path length on each axis and the difference is formed in the subsequent numerical processing.

When obtaining pressure measurements, it may be desirable to avoid extraneous strain on the fiber since it cannot be distinguished from temperature. Other embodiments of the invention may employ a multi-core fiber where one core is pressure sensitive and another core either is not pressure sensitive or is less pressure sensitive. Here, the combination of the data from each core, and from each axis, permits the separation of temperature, pressure and strain distributions.

Other types of multi-core fibers (or structures incorporating multiple optical cores) may allow the shape of the structure to be determined with a high degree of resolution. For instance, adding at least one helically-positioned core provides additional measurement on twist in the structure.

A number of other parameters may be measured using the OTDR/OFDR technique described above by using a conversion to strain through special coatings. For example, electric and magnetic fields may be mapped by means of fibers having electro-strictive or magneto-strictive coatings, respectively. Because certain coatings react selectively to exposure to certain chemicals by changing dimension, this effect can be exploited to use the fiber as a chemical detector.

Figure 5:
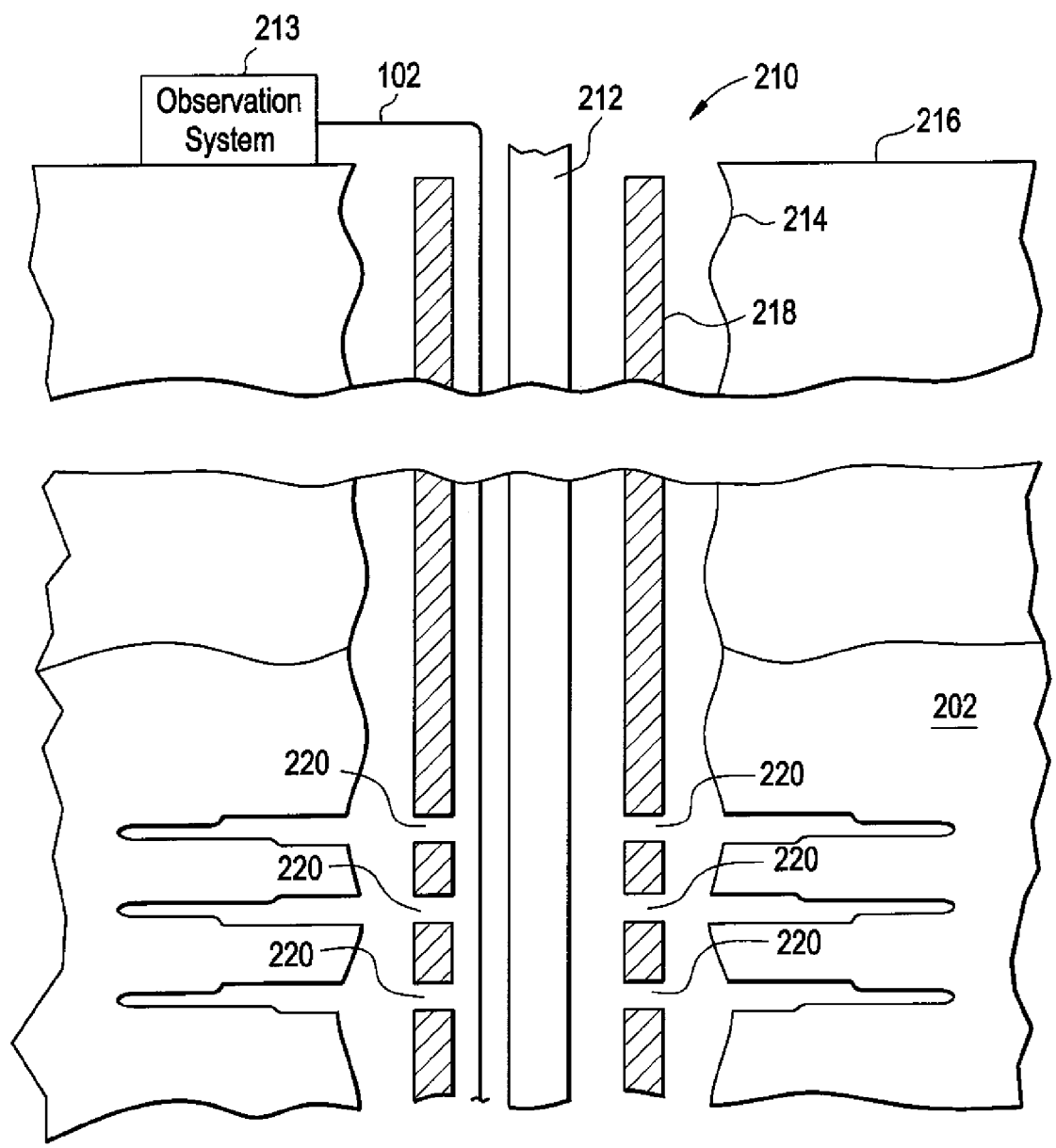
FIG. 5 is a diagram of the distributed sensor system of FIG. 1 used in a well, in accordance with an embodiment of the invention.

The extremely high resolution of the measured parameter of interest makes the technique described above particularly suited to applications in the gas or oilfield, as illustrated in FIG. 5. In FIG. 5, the sensing optical fiber 102 is deployed in a well 210 to observe physical parameters associated with a region of interest 212. In some embodiments, the fiber 102 may be deployed through a control line. An observation system 213 coupled to the fiber 102 is configured to transmit interrogating pulses, detect returned optical signals, and acquire the observed physical parameters from the detected signals in the manner described above. To reach the region of interest 212, a well bore 214 is drilled through a surface 216 and a casing 218 is lowered into the bore 214. Perforations 220 are created through the casing 218 to establish fluid communication between the well bore 214 and the formation in the region of interest 212 around the perforations 220. A production tubing 222 is then installed and set in place such that production of fluids through the tubing 222 can then be established. Although a cased well structure is shown, embodiments of the present invention may not be limited to this illustrative example. Un-cased, open hole, gravel packed, deviated, horizontal, multi-lateral, deep sea or terrestrial surface injection and/or production wells (among others), may incorporate an observation system as previously described.

In many such applications, temperature and pressure profiles obtained from the region of interest 212 may provide useful information that may be used to enhance production. For example, the use of temperature profiles acquired using conventional production logging, and more recently, distributed temperature sensors, is known to provide, through a variety of interpretation methods, detailed information on the in-flow profile (in producing wells), and the injectivity profile (in injection wells). However, the performance of existing equipment is limited to a few centiKelvin. Moreover, a sizeable acquisition time is needed to achieve even this degree of resolution, thus limiting the use of transient analysis methods. In accordance with the acquisition technique described above, resolutions on the order of 1 milliKelvin, or less, may be obtained in only a few seconds. The higher resolution and rapid acquisition time provides for far more precise flow distributions to be inferred in more challenging circumstances, such as wells that are close to, or entirely, horizontal (i.e., where the absence of a geothermal gradient makes the interpretation more difficult). A transient analysis may also provide information on the heat capacity of the fluid at each depth within the well and thus provide a distribution of the water cut. Such information is important in the management of the wells, particularly in mature fields.

Yet further, the technique described herein may be used to take a direct measurement of the pressure distribution that may assist with the interpretation of temperature profiles in terms of multiphase flow. For example, in deviated wells, the pressure distribution is primarily determined by the fluid density and deviation angle. In horizontal wells, the pressure drop due to frictional losses is a further measure of the flow distribution; this together with a high resolution temperature profile provides an indication of the nature and fluid entry distribution.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of determining a physical parameter associated with an optical fiber, comprising:
   launching a plurality of interrogating pulses into the optical fiber, wherein at least a first interrogating pulse has a first optical frequency and a second interrogating pulse has a second optical frequency different than the first optical frequency;
   acquiring, for each of the plurality of interrogating pulses, time resolved Rayleigh backscatter signals at a plurality of locations along at least a portion of the length of the optical fiber;
   comparing the time resolved Rayleigh backscatter signals from the first plurality of interrogating pulses with the time resolved Rayleigh backscatter signals from the second plurality of interrogating pulses; and
   based on the comparing, determining a distribution of a first physical parameter along at least the portion of the length of the optical fiber.

2. The method as recited in claim 1, further comprising:
   storing in a memory a signature of the optical fiber, the signature corresponding to time resolved Rayleigh backscatter signals as a function of optical frequency at the plurality of locations along at least the portion of the length of the optical fiber while the optical fiber is in a known physical state.

3. The method as recited in claim 2, wherein determining the distribution of the first physical parameter comprises determining a frequency shift required for the acquired time resolved Rayleigh backscatter signals to substantially align with the stored signature.

4. The method as recited in claim 1, further comprising adjusting the optical carrier frequency in a plurality of steps over a frequency range.

5. The method as recited in claim 4, wherein the steps are uniform.

6. The method as recited in claim 1, wherein the second interrogating pulse is adjacent in time to the first interrogating pulse.

7. The method as recited in claim 1, wherein the first and second interrogating pulses are launched simultaneously.

8. The method as recited in claim 1, further comprising determining a distribution of a second physical parameter along the length of the optical fiber, wherein the second physical parameter is different than the first physical parameter.

9. The method as recited in claim 8, further comprising detecting Raman scattering in response to an interrogating pulse, wherein determining the distribution of the second physical parameter is based on the detected Raman scattering.

10. The method as recited in claim 8, further comprising detecting Brillouin scattering in response to an interrogating pulse, wherein determining the distribution of the second physical parameter is based on the detected Brillouin scattering.

11. The method as recited in claim 8, wherein the optical fiber is a birefringent fiber having a first axis and a second axis, and wherein determining the distribution of the first physical parameter is based on a first plurality of time resolved Rayleigh backscatter signals produced along the first axis at a plurality of optical frequencies, and wherein determining the distribution of the second physical parameter is based on a second plurality of time resolved Rayleigh backscatter signals produced along the second axis at a plurality of optical frequencies.

12. The method as recited in claim 11, further comprising:
   providing the optical fiber in a well; and
   determining a flow profile of the well based on the distributions of the first and second physical parameters.

13. The method as recited in claim 12, wherein the first physical parameter is pressure and the second physical parameter is temperature.

14. The method as recited in claim 1, wherein acquiring the time resolved Rayleigh backscatter signals comprises coherently detecting the Rayleigh backscattered produced by the optical fiber in response to the first and second interrogating pulses.

15. A system, comprising:
   an optical fiber;
   an optical source to output an optical pulse at each of a plurality of optical frequencies for launching into the optical fiber; and
   a detection and acquisition system coupled to the optical fiber and configured to:
      detect Rayleigh backscatter corresponding to each launched optical pulse as a function of time;
      based on the detected Rayleigh backscatter, acquire a time resolved coherent Rayleigh spectra (TRCRS) measurement corresponding to each of the optical frequencies;
      save at least one of the time resolved coherent Rayleigh spectra (TRCRS) measurements as a baseline;
      compare the time resolved Rayleigh coherent spectra (TRCRS) corresponding to given optical frequencies to the baseline; and
   determine a distribution of a physical parameter along a length of the fiber based on the TRCRS measurement comparison at each of the plurality of optical frequencies.

16. The system as recited in claim 15, further comprising a memory to store a signature of the optical fiber, the signature corresponding to Rayleigh backscatter along the length of the optical fiber as a function of optical frequency while the optical fiber is in a known state.

17. The system as recited in claim 16, wherein the detection and acquisition system is configured to determine the physical parameter based on a comparison between the stored signature and the TRCRS measurement at each of the optical frequencies.

18. The system as recited in claim 15, wherein the detection and acquisition system is configured to coherently detect the Rayleigh backscatter.

19. The system as recited in claim 18, wherein the optical source is configured to output the optical pulse at each of the plurality of optical frequencies for launching simultaneously into the optical fiber.

20. The system as recited in claim 15, wherein the detection and acquisition system is configured to detect a phase and an intensity of the Rayleigh backscatter.

21. The system as recited in claim 15, wherein the optical fiber is a birefringent fiber having a plurality of axes, and wherein the detection and acquisition system is configured to detect the Rayleigh backscatter produced along each of the axes.

22. The system as recited in claim 21, wherein the optical fiber is disposed in a well, and wherein the detection and acquisition system is further configured to determine a distribution of a first physical parameter based on the detected Rayleigh backscatter produced along a first axis of the birefringent fiber and a distribution of a second physical parameter based on the detected Rayleigh backscatter produced along a second axis of the birefringent fiber.

23. The system as recited in claim 22, wherein the first physical parameter is pressure, and the second physical parameter is temperature.

24. The system as recited in claim 23, wherein the detection and acquisition system is further configured to determine a flow profile of the well based on the distribution of the first and second physical parameters.

25. A method of determining a physical parameter associated with an optical fiber, comprising:
    providing a signature of the optical fiber, the signature corresponding to time resolved coherent Rayleigh spectra measurements taken along at least a portion of the optical fiber at a plurality of optical frequencies;
    launching a plurality of interrogating pulses into the optical fiber, wherein at least a first interrogating pulse has a first optical frequency and a second interrogating pulse has a second optical frequency different than the first optical frequency;
    acquiring, for each of the plurality of interrogating pulses, time resolved Rayleigh backscatter spectra at a plurality of locations along at least a portion of the length of the optical fiber;
    comparing the acquired time resolved Rayleigh backscatter spectra to the signature; and
    based on the comparing, determining a distribution of a physical parameter along at least the portion of the length of the optical fiber.

26. The method as recited in claim 25, further comprising coherently detecting Rayleigh backscatter produced by the optical fiber in response to each of the interrogating pulses.

27. The method as recited in claim 26, wherein the plurality of interrogating pulses are launched into the optical fiber simultaneously.

28. The method as recited in claim 26, wherein the plurality of interrogating pulses are launched into the optical fiber sequentially.

29. The method as recited in claim 25, wherein each launched interrogating pulse is adjacent in time to the previously launched interrogating pulse.

30. The system as recited in claim 25, further comprising:
    providing the optical fiber in a well; and
    determining a flow profile of the well based on the distribution of the physical parameter.

* * * * *